United States Patent

Pailer et al.

[11] 3,883,538
[45] May 13, 1975

[54] DIOXOLANES AND OXATHIOLANES

[75] Inventors: Matthias Pailer; Friedrich Takacs; Wolfgang Streicher, all of Vienna, Austria

[73] Assignee: Rowa Wagner KG, Bensberg, Germany

[22] Filed: Jan. 26, 1973

[21] Appl. No.: 326,618

Related U.S. Application Data

[63] Continuation of Ser. No. 806,295, March 11, 1969, abandoned, which is a continuation-in-part of Ser. No. 584,111, Oct. 4, 1966, abandoned.

[30] Foreign Application Priority Data

Oct. 5, 1965   Austria ............................... 8981/65
Mar. 15, 1968  Austria ............................... 2591/68

[52] U.S. Cl. ................ 260/293.67; 260/247.1 P; 260/247.2 B; 260/247.7 A; 260/268 H; 260/247.7 K; 260/268 R; 260/293.89; 260/293.9; 260/294.8 D; 260/294.8 G; 260/295 R; 260/326.1; 260/326.11; 260/326.36; 260/326.5 J; 260/327 M; 260/340.2; 260/326.5 R; 260/514 R; 260/516; 260/521 R; 260/535 R; 260/584 A; 260/584 C; 260/601 R; 260/601 H; 260/609 R; 260/606.5 P; 260/615 A; 424/274; 260/652 R; 424/250; 424/263; 424/248; 424/267; 424/278; 424/276

[51] Int. Cl............................................ C07d 29/24
[58] Field of Search ............ 260/327, 340.2, 293.45, 260/294.3 C, 326.1, 326.11, 326.3, 268 H, 247.1, 247.2 B, 293.67

[56] References Cited
UNITED STATES PATENTS
3,209,012   9/1965   Miller et al. ........................ 260/327

Primary Examiner—Henry R. Jiles
Assistant Examiner—S. D. Winters
Attorney, Agent, or Firm—Burgess, Dinklage & Sprung

[57] ABSTRACT

Novel compounds constituting dioxolanes and oxathiolanes their acid addition and quaternary ammonium salts possessed of antispasmodic activity having the formula:

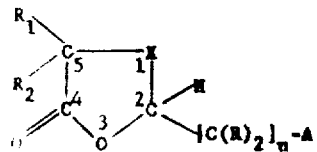

wherein $R_1$ and $R_2$ are each a member of the group consisting of aryl, pyridyl, alkyl, cycloalkyl, alkylphenyl and alkoxyphenyl, R is hydrogen or lower alkyl, n has a value of from 1 to 4, X is an oxygen or sulfur atom and A is halogen

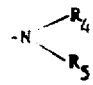

$-S-R_4$ and

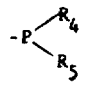

wherein $R_4$ and $R_5$ are hydrogen, or alkyl, having up to 8 carbon atoms and further groups wherein $R_4$ and $R_5$ together with the nitrogen atom to which they are attached form a heterocyclic group. Methods of preparing and using the same are also disclosed.

14 Claims, No Drawings

DIOXOLANES AND OXATHIOLANES

This is a continuation, of application Ser. No. 806,295 filed Mar. 11, 1969, which in turn is a continuation-in-part of Ser. No. 584,111 of Oct. 4, 1966.

This invention relates to novel chemical compounds and methods of preparing the same. More particularly, this invention is concerned with dioxolanes and oxathiolanes and novel derivatives thereof and processes for producing such compounds.

According to this invention there is provided a novel class of compounds of the formula:

(I)

and the salts thereof, wherein $R_1$ is a member of the group consisting of phenyl, alkyl, such as methyl, ethyl, propyl, isopropyl, butyl, isobutyl, sec. butyl and the like; cycloalkyl, such as cyclohexyl, cyclopentyl and the like; and like substituted groups wherein the substituents are alkyl and alkoxy groups, as, for instance, alkyl-phenyl, alkoxy-phenyl, for instance, methoxy-phenyl, ethoxy-phenyl, phenylene-dioxy-phenyl, and the like; $R_2$ represents the same or different groups represented by $R_1$; R represents hydrogen or alkyl having 1 to 4 carbon atoms, and where there is more than one R they need not be the same, for instance, $[C(R)_2]n$- can be methylene, 1,2-ethylene, 1,3-propylene, 1,4-butylene and such groups substituted by alkyl having 1 to 4 carbon atoms; n is an integer of 1 to 4; X is oxygen or sulfur; and A is a member of the group consisting of halogen,

S–$R_4$ and

wherein $R_4$ and $R_5$ each represents a member of the group of hydrogen and alkyl having up to 8 carbon atoms, and wherein

represents a heterocyclic group formed by joining $R_4$ and $R_5$ so that the nitrogen becomes a part of the ring including the piperidino, morpholino, pyrrolidino, isoindolino, piperazino, N-alkylpiperazino, 3- or 4-hydroxypiperazino, indolino, and the like.

The compounds of this invention possess antispasmodic properties. It is known that the antispasmodics presently in use act to develop either a pronounced musculotropic or neurotropic specificity of action. The known synthetically manufactured compounds are usually esters or ethers of benzilic acid or their hydrogenation products with certain amino alcohols.

The compounds of this invention surprisingly exhibit a good two-fold action in the above sense; further, they are easily soluble in water and are stable against attack from acids or bases. Furthermore, they are substantially non-toxic, no harmful or adverse side effects having as yet been observed following their administration.

The compounds of this invention can be prepared by a reaction between an acid of the formula:

(II)

wherein X, $R_1$ and $R_2$ have the significance previously assigned and a compound of the formula:

(III)

wherein R, A and n have the significance previously assigned and B represents a dihalogen methyl group, an aldehyde group, or a derivative thereof, as for example, acetal, thioacetal or a bisulfite addition compound, and where A is halogen, the resultant product corresponding to Formula I can be reacted, if desired, with a compound selected from the group of compounds of the formula:

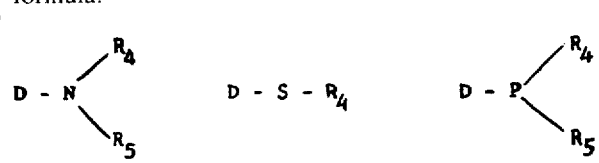

wherein $R_4$ and $R_5$ have the significance previously assigned and D represents a member selected from the group consisting of hydrogen and alkali metals.

In accordance with the invention it has been found that the dioxolanes and oxathiolanes can be prepared in a most advantageous manner by reacting an acid of the Formula II (above) with a compound of the formula:

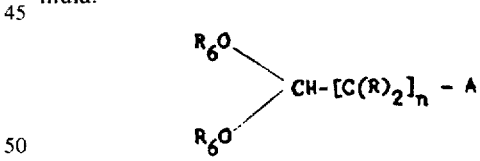

wherein A, R and n have the significance previously assigned and $R_6$ represents a methyl or ethyl group, in the presence of an acetylating agent, and continuously removing the acetic acid ester formed from the reaction mixture. Thereafter the base formed can be converted to a salt of a pharmaceutically acceptable acid, if desired.

As a result of the fact that the alcohol which is formed during the reaction is converted by the acetylating agent to an acetic acid methyl or ethyl ester as soon as it is formed, this acetic acid methyl or ethyl ester can be continuously and easily separated from the reaction mixture because of its low boiling point.

It is advantageous to use acetic anhydride as the acetylating agent. The acetylating agent is used in an excess above the equivalent amount in order to assure that the alcohol released in the reaction is actually immediately and completely converted into the corresponding ester and removed from the reaction mixture.

The bases represented here are useful as intermediates in the preparation of the salts also described in the application.

The term "salts" as used herein is intended to include all non-toxic or pharmacologically acceptable salts of the free bases, including both the acid addition salts and the quaternary ammonium salts and sulfonium salts.

The organic bases of the foregoing type form salts with a variety of inorganic and strong organic acids including sulfuric, phosphoric, hydrochloric, hydrobromic, sulfamic, citric, oxalic, ascorbic, and related acids. They also form quaternary ammonium salts with a variety of organic esters of sulfuric, hydrohalic, and aromatic sulfonic acids. Among such esters are alkyl chloride, iodide and bromide, benzyl chloride and bromide, dimethyl sulfate, methyl benzene sulfonate, ethylene chlorohydrin, methallyl bromide, and the like.

Some of the compounds of Formula II which may be used in the reaction are benzilic acid, thiobenzilic acid of the formula:

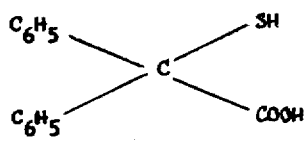

phenylcyclohexylglycolic acid, dicyclohexylglycolic acid and diphenylene-glycolic acid of the formula:

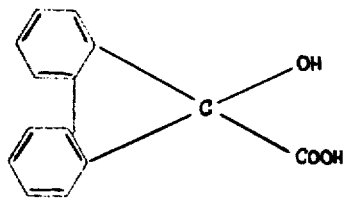

Some of the compounds of Formula III which may be used as reactants in this process are the dimethyl and diethylacetals of $\beta$-chloro, $\beta$-N-dimethylamino-, $\beta$-N-diethylamino- and $\beta$-N-piperidylpropionaldehyde, $\alpha,\alpha$-dimethyl-$\beta$-N-diethylaminopropionaldehyde and $\beta$-thiomethylpropionaldehyde.

The hitherto unknown diethylacetals of $\beta$-N-dimethylamino-, $\beta$-N-diethylamino- and $\beta$-N-piperidylpropionaldehyde are prepared from $\beta$-chloropropionaldehydediethylacetal and dimethylamine, diethylamine or piperidine by boiling the reactants together in an inert solvent or by direct heating of the reactants in a bomb tube.

The acid addition salts may be suitably prepared directly from the reaction mixture by acidifying with dilute acid such as hydrochloric acid. The alkyl halide quaternary salts are suitably prepared by treating the base in an anhydrous solvent medium with an excess of the alkyl halide and recrystallizing the product from ethanol.

The following Examples are given in order to more clearly disclose the nature of the present invention. It should be understood, however, that the Examples are not intended to be a limitation on the scope of the invention.

EXAMPLE 1

2-($\beta$-N-dimethylaminoethyl)-4,4-diphenyl-1,3-dioxolan-one(5)-HCl 23 g (0.1 mol) benzilic acid and 18.3 g (0.11 mol) $\beta$-(N-dimethyl)propionaldehydediethylacetal were dissolved in 200 ml glacial acetic acid. Dry HCl gas was introduced with agitation at room temperature into the resulting solution to the saturation point. The mixture was allowed to stand for 1 hour. After the glacial acetic acid had been removed by evaporation at low temperature in a vacuum, the reaction product was poured into ice-water, the acid fractions neutralized with solid $NaHCO_3$, and the neutral substances extracted with diethylether. Following drying and removal of the solvent by evaporation, an oil remained. It could be purified by column chromatography on silica gel (0.05 – 0.2 mm diameter (Merck)) with $CHCl_3$ by adding increasing amounts of $CH_3OH$. The product, which was established by thin-layer chromatography on silica gel (type) $SiHF_{254}$ glass plates (Merck) using $CHCl_3$ as the eluant to be a single substance, was dissolved in absolute diethylether. Dry HCl gas was fed into the cooled solution thereby produced up to the saturation point. The precipitated product could be purified by dissolution and crystallizztion out of a mixture of isopropanol and diethylether. Melting point 175° – 178°C.

EXAMPLE 2

2-($\beta$-N-piperidylethyl)-4,4-diphenyl-1,3-dioxolan-one(5)-HCl 33 g (0.14 mol) benzilic acid and 22 g (0.13 mol) $\beta$-chloropropionaldehydediethylacetal were dissolved by heating in 100 ml glacial acetic acid. After cooling to 40°C a slow current of dry HCl gas was introduced with agitation into the solution for a period of 2½ hours. After removing the glacial acetic acid by evaporation in a vacuum, the oil which remained was dissolved in $CH_2Cl_2$ and treated with solid $KHCO_3$. When the evolution of $CO_2$ had terminated, water was added and the organic phase neutralized with $KHCO_3$ solution. After drying, the solvent was removed; the remaining oil distilled over in a high vacuum of 0.001 mm at 120° – 130°C 2-($\beta$-chloroethyl)-4,4-diphenyl-1,3-dioxolan-one(5) was thereby recovered.

This latter compound was boiled with 12 g of dry piperidine in 120 ml of absolute benzene for 12 hours with refluxing. A total of 6 g of piperidine hydrochloride was thereby precipitated out. The latter was removed by filtering and the benzene solution remaining concentrated by evaporation. The residue was dissolved with a little chloroform and the solution was applied to a short, dry aluminum oxide column (according to Brockmann). It was then elutriated with chloroform. After the solution had been concentrated by evaporation, an oil was obtained which was dissolved with absolute diethyl ether. The introduction of dry HCl gas into the cooled solution produced a precipitate that was dissolved and crystallized out of a mixture of isopropanol and ether. Melting point 193° – 199°C.

The following compounds were prepared using an analogous procedure:

(In Examples a and b, the stable-free aldehydes were used in place of the diacetals of the corresponding aminoaldehydes).

a. 2-(α,α-dimethyl-β-N-diethylaminoethyl)-4,4-diphenyl-1,3-dioxolan-one(5)
    Free base         Oil
    Hydrochloride     Oil
b. 2-(β-thiomethylethyl)-4,4-diphenyl-1,3-dioxolan-one(5)
    Free base         Oil
    Sulfonium salt
    formed with
    CH₃I              Oil
c. 2-(β-N-diethylaminoethyl)-4,4-diphenyl-1,3-dioxolan-one(5)
    Free base         Oil
    Hydrochloride     M.P.    166 – 173°C
d. 2(β-N-diethylaminoethyl)-4-diphenylene-1,3-dioxolan-one(5)
    Free base         Oil
    Hydrochloride     M.P.    202 – 204°C
e. 2-(β-N-diethylaminoethyl)-4-cyclohexyl-4-phenyl-1,3-dioxolan-one(5)
    Free base         Oil
    Hydrochloride     M.P.    187 – 190°C
f. 2-(β-N-diethylaminoethyl)-4,4-dicyclohexyl-1,3-dioxolan-one(5)
    Free base         Oil
    Hydrochloride     M.P.    194 – 197°C (In Examples g, h, and i, thiobenzilic acid was used in the reaction instead of benzilic acid.)

g. 2-(β-N-dimethylaminoethyl)-4,4-diphenyl-1,3-oxathiolan-one(5)
    Free base         Oil
    Hydrochloride     M.P.    161 – 164°C
h. 2-(β-N-diethylaminoethyl)-4,4-diphenyl-1,3-oxathiolan-one(5)
    Free base         Oil
    Hydrochloride     M.P.    161 – 166°C
i. 2-(β-N-piperidylethyl)-4,4-diphenyl-1,3-oxathiolan-one(5)
    Free base         Oil
    Hydrochloride     M.P.    213 – 217°C
k. 2-(β-N-diethylaminoethyl)-4-phenyl-4-(p-methoxyphenyl)-1,3-dioxolan-one(5)
    Free base         Oil
    Hydrochloride     M.P.    163 – 165°C
l. 2-(β-N-methyl-N-n-octylaminoethyl)-4,4-diphenyl-1,3-dioxolan-one(5)
    Free base         Oil
m. 2-(β-N-pyrrolidinoethyl)-4,4-diphenyl-1,3-dioxolan-one(5)
    Free base         Oil
    Hydrochloride     M.P.    163 – 166°C
n. 2-(β-N-morpholinoethyl)-4,4-diphenyl-1,3-dioxolan-one(5)
    Free base         Oil
    Hydrochloride     M.P.    208 – 216°C The compounds listed above are characterized by an intense carbonyl absorption in the infrared spectral region (strained 5-ring). In the case of the 1,3-dioxolanone(5) derivatives, it is located at 1800 cm$^{-1}$, and in the case of the 1,3-oxathiolanone(5) derivatives, it is located at 1780 cm$^{-1}$.

This property serves to identify this class of compounds both qualitatively and can be used for their quantitative determination.

EXAMPLE 3

In a four-liter, four-necked round flask, provided with a good agitator, gas feed tube, thermometer and a reflux condenser having a gas exhaust tube, 455 g of benzilic acid (2.0 mols), 376 g of β-N-piperidylpropionaldehydedimethylacetal (2.0 mols), 408 g of acetic anhydride (4.0 mols) and 1.0 liter of glacial acetic acid were intimately mixed together. The mixture thereby warmed up slightly and became homogeneous.

Into a well agitated reaction mixture the dry HCl gas was introduced following warming of the latter up to about 75°C. The HCl gas saturation at this temperature amounted to somewhat more than the same molar quantity of the aminoacetal, and was reached under the above conditions in 2 to 3 hours. Then, by means of a heating hood and a regulating transformer, the temperature of the reaction mixture was increased to about 110° – 120°C and the acetic acid methyl ester which was formed in the reaction was continuously removed through a well packed column, whereupon the dissolved hydrochloric acid also escaped. The quantity of the acetic acid methyl ester and the boiling point of approximately 60°C correspond to a substantially complete shift of the equilibrium of the above reaction to 1,3-dioxolanone-(5). After the development of acetic acid methyl ester had terminated, the acetic acid was removed in a water bath under vacuum. The residue was then mixed with absolute dioxane in the same flask. After cooling and long standing, the crude hydrochloride of the above compound crystallized out. Thereafter the acetic acid, acetic anhydride, the excess hydrochloric acid and most of the resins were separated from the crystals by suction filtering.

The hydrochloride thusly obtained could be further purified by twice redissolving it out of a small amount of a mixture of absolute isopropanol and absolute diethyl ether. The melting point (in capillary with decomposition) was 207° – 209°C. An infrared spectrum (KBr) showed all the characteristic bands of 2-(β-N-piperidylethyl)-4,4-diphenyl-1,3-dioxolanone-(5)-HCl. The yield amounted to 675 g (87 percent of theory).

EXAMPLE 4

The same procedure was followed as decribed in Example 3, but instead of 2 mols of benzilic acid, 2 mols of α-phenyl-α-cyclohexyl-α-hydroxyacetic acid were used. The yield in this case amounted to 90 percent of theory of 2-(β-N-piperidylethyl)-4-phenyl-4-cyclohexyl-1,3-dioxolanone-(5)-HCl.

The compounds of the invention are characterized by their antispasmodic activity. In order to unequivocally establish the spasmolytic properties of the compounds of the invention, a series of experiments were carried out comparing them with the known spasmolytic agents. (In this connection it should be noted that the fact that the compounds of the invention possess spasmolytic activity is to be considered most surprising, since the known spasmolytic agents belong to chemically and structurally unrelated groups.)

The compounds as hereinafter listed were tested for spasmolytic action in vitro on the isolated rabbit intestine (method according to MAGNUS).

A - 2-(β-N-dimethylaminoethyl)-4,4-diphenyl-1,3-dioxolaneone(5)
B - 2-(β-N-piperidylethyl)-4,4-diphenyl-1,3-dioxolane-one(5)
C - 2-(α,α-dimethyl-β-N-diethylaminoethyl)-4,4-diphenyl-1,3-dioxolaneone(5)
D - 2-(β-methylthioethyl)-4,4-diphenyl-1,3-dioxolaneone(5)
E - 2-(β-N-diethylaminoethyl)-4,4-diphenyl-1,3-dioxolane-one(5)
F - 2-(β-N-diethylaminoethyl)-4-diphenylene-1,3-dioxolaneone(5)
G - 2-(β-N-diethylaminoethyl)-4-cyclohexyl-4-phenyl-1,3-dioxolaneone(5)
H - 2-(β-N-diethylaminoethyl)-4,4-dicyclohexyl-1,3-

-Continued

- I - 2-(β-N-dimethylaminoethyl)-4,4-diphenyl-1,3-oxathiolaneone(5)
- J - 2-(β-N-diethylaminoethyl)-4,4-diphenyl-1,3-oxthiolaneone(5)
- K - 2-(β-N-piperidylethyl)-4,4-diphenyl-1,3-oxathiolaneone(5)
- L - 2-(β-N-diethylaminoethyl)-4-phenyl-4-(p-methoxyphenyl-1,3-dioxolaneone(5)

The following results were obtained in the comparison with atropine and papaverine.

TABLE

| COMPOUND | ATROPINE = 100 | PAPAVERINE = 100 |
|---|---|---|
| A | 20 | 100 |
| B | 0.02; 0.22 | 447; 736 |
| C | 2.0 | 150 |
| D | 2.0 | 100 |
| E | 0.02; 0.02 | 76; 150 |
| F | 0.01; 0.04 | 215; 79 |
| G | 2.15; 1.65 | 1260; 1121 |
| H | 0.08 | 63 |
| I | 1.0 | 200 |
| J | 0.29; 0.34 | 271; 200 |
| K | 0.03; 0.02 | 171; 171 |
| L | 0.01; 0.01 | 216; 223 |

All of the above-named compounds demonstrated excellent spasmolytic activity. The nature of their neurotropic spasmolytic action also appeared, though it is weaker than that of atropine.

The musculotropic spasmolytic potency of the compounds herein exceeds that of papaverine, by several times in some cases. In the case of 2-(β-N-diethylaminoethyl)-4-cyclohexyl-4-phenyl-1,3-dioxolaneone(5) the compound is 11 to 12 times more potent.

The compounds also have a good spasmolytic effect on the whole animal.

The dose required for producing spasmolytic action is:

5 to 10 mg/kg for the cat, administered intravenously
4 to 6 mg/kg for the rabbit, administered intravenously
50 to 100 mg/kg for the cat, administered orally
50 to 100 mg/kg for the rabbit, administered orally.

In comparison of the action of the compounds above named with N-butylscopolamine on the whole animal, 2-(β-N-piperidylethyl)-4,4-diphenyl-1,3-dioxolaneone(5) proved to be stronger and longer-lasting than N-butylscopolamine.

Of special interest is the complete absence of side-effects of spasmolytically effective doses on the circulation, heart and respiration.

An acute toxicity experiment was also carried out and insignificant ("slight") value was found for the compounds named herein, with various methods of application.

Thus 2-(β-N-piperidylethyl)-4,4-diphenyl-1,3-dioxolaneone(5) was tolerated by male and female white rats, strain BR 46/Wistar 2, in a dose of as much as 400 mg/kg per day, under subchronic administration (90 days, fed by throat catheter).

In clinical tests on man, the effective dose has been established as 5 to 10 mg 2 to 3 times daily.

In normal clinical use, the compounds can be employed in both the free and the salt form. The activity of the compounds is independent of whether they are in salt form or otherwise.

The products of this process may be combined with a pharmaceutical carrier for administration to humans in an amount to attain the desired antispasmodic effect. Such carriers are either solid or liquid. Exemplary of solid pharmaceutical carriers are lactose, cornstarch, mannitol, talc, etc. The compounds of this invention are mixed with a carrier and filled into hard gelatin capsules or tabletted with suitable tabletting aids, such as magnesium stearate, starch, or other lubricants, disintegrants or coloring agents. If combination with a liquid carrier is desirable, a soft gelatin capsule is filled with a slurry or other dispersion of the novel compounds in soya-bean, corn or peanut oil. Aqueous suspensions or solutions are prepared for alternate, oral or parenteral administration.

We claim:

1. A compound selected from the group consisting of bases of the formula:

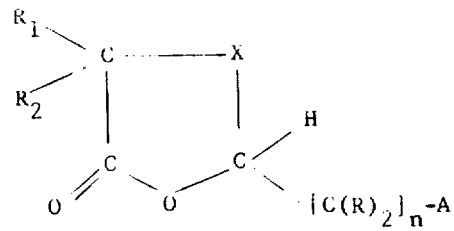

the non-toxic quaternary ammonium salts and the non-toxic acid addition salts thereof wherein $R_1$ and $R_2$ are each a member selected from the group consisting of phenyl, alkyl having 1 to 4 carbon atoms, cycloalkyl having 5 to 6 carbon atoms in the ring, and alkoxyphenyl wherein the alkyl portion of said alkoxy group contains 1 to 2 carbon atoms, or taken together are 2,2'-diphenylene, R represents a member selected from the group consisting of hydrogen and lower alkyl, $n$ is an integer of 1 to 4, X represents a member selected from the group consisting of oxygen and sulfur atoms, A represents a member selected from the group consisting of halogen,

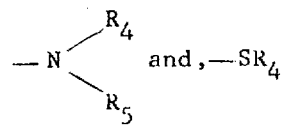

wherein $R_4$ and $R_5$ each represents a member of the group of hydrogen and alkyl having up to 8 carbon atoms, and groups in which

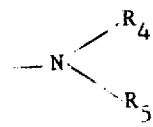

represents a member selected from the group consisting of piperidino, morpholino and pyrrolidino.

2. A compound according to claim 1 designated 2-(β-N-dimethylaminoethyl)-4,4-diphenyl-1,3-dioxolanone(5).

3. A compound according to claim 1 designated 2-(β-N-piperidylethyl)-4,4-diphenyl-1,3-dioxolan-one(5).

4. A compound according to claim 1 designated 2-(α,α-dimethyl-β-N-diethylaminoethyl)-4,4-diphenyl-1,3-dioxolan-one(5).

5. A compound according to claim 1 designated 2-(β-methylthioethyl)-4,4-diphenyl-1,3-dioxolan-one(5).

6. A compound according to claim 1 designated 2-(β-N-diethylaminoethyl)-4,4-diphenyl-1,3-dioxolan-one(5).

7. A compound according to claim 1 designated 2-(β-N-diethylaminoethyl)-4-(2,2'-diphenylene)-1,3-dioxolan-one(5).

8. A compound according to calim 1 designated 2-(β-N-diethylaminoethyl)-4-cyclohexyl-4-phenyl-1,3-dioxolan-one(5).

9. A compound according to claim 1 designated 2-(β-N-diethylaminoethyl)-4,4-dicyclohexyl-1,3-dioxolan-one(5).

10. A compound according to claim 1 designated 2-(β-N-dimethylaminoethyl)-4,4-diphenyl-1,3-oxathiolan-one(5).

11. A compound according to claim 1 designated 2-(β-N-diethylaminoethyl)-4,4-diphenyl-1,3-oxathiolan-one(5).

12. A compound according to claim 1 designated 2-(β-N-piperidylethyl)-4,4-diphenyl-1,3-oxathiolan-one(5).

13. A compound according to claim 1 designated 2-(β-N-diethylaminoethyl)-4-phenyl-4-(p-methoxyphenyl)-1,3-dioxolan-one(5).

14. A compound according to claim 1 designated 2-(β-N-piperidylethyl)-4-phenyl-4-cyclohexyl-1,3-dioxolan-one(5).

* * * * *